United States Patent [19]

Osawa

[11] Patent Number: 4,828,402
[45] Date of Patent: May 9, 1989

[54] LINEAR GUIDE APPARATUS

[75] Inventor: Nobuyuki Osawa, Takasaki, Japan

[73] Assignee: Nippon Seiko Kabushiki Kaisha, Tokyo, Japan

[21] Appl. No.: 181,543

[22] Filed: Apr. 14, 1988

[30] Foreign Application Priority Data

Apr. 21, 1987 [JP] Japan ................................ 62-60378

[51] Int. Cl.[4] ............................................ F16C 29/06
[52] U.S. Cl. ...................................... 384/15; 384/45
[58] Field of Search ...................... 384/15, 45, 49, 43, 384/44, 16

[56] References Cited

U.S. PATENT DOCUMENTS

| 3,515,444 | 6/1970 | Grabner | 384/15 |
| 4,411,478 | 10/1983 | Olschewski et al. | 384/15 |
| 4,615,569 | 10/1986 | Hirata | 384/45 |
| 4,659,239 | 4/1987 | Teramachi | 384/45 |

Primary Examiner—Lenard A. Footland
Attorney, Agent, or Firm—Basile and Hanlon

[57] ABSTRACT

A dust proof device used with a linear guide apparatus includes a strap-shaped plate fixed to the upper surface of a guide rail throughout the whole length of the guide rail to cover the openings of through holes used for inserting bolts which secure the guide rail to a base. The strap-shaped plate is fixed at opposite ends thereof to the guide rail by fixing screws together with hold-down square blocks placed on the strap-shaped plate.

2 Claims, 2 Drawing Sheets

LINEAR GUIDE APPARATUS

BACKGROUND OF THE INVENTION

1. Field of the Invention

The present invention relates to a linear guide apparatus including a guide rail, and a slider supported through balls on the guide rail and movable in the axial direction, and in particular, to an improvement in a dust proof structure of the guide rail.

2. Description of the Prior Art

In a prior art linear guide apparatus, a slider is mounted on an axially extending guide rail through many rollable balls so that the slider is movable linearly. The guide rail is secured to a base by tightening securing bolts which are inserted through a plurality of bolt holes formed by penetrating a trunk portion of the guide rail. The slider, having a driven member attached thereon, moves along the guide rail. Furthermore, since the dust, dirt, chips, etc., deposited on the upper surface of the guide rail disturb smooth rolling of the balls, wiper seals for removing dust deposits are fixed to opposite ends of the slider.

In such a structure, when the securing bolts are tightened to secure the guide rail to the base, the bolt heads sink in the bolt holes, and recesses are formed in the upper surface of the guide rail. Thus, dust and the like deposited in the recesses will intrude into the inside of the slider passing under the wiper seals to disturb the smooth movement of the slider. For this reason, it has been generally practiced to apply embedding plugs into the recesses. However, it is very difficult to completely eliminate the stepped portions formed between the plug heads and the upper surface of the guide rail surrounding the bolt holes, and dust is still deposited in any remaining recesses. Moreover, another problem is involved in that lip portions of the wiper seals are caught by the edges of the recesses resulting in changes in the sliding resistance of the wiper seals.

Accordingly, the inventors of the present application previously proposed a linear guide apparatus which has no stepped portions at the bolt holes (Japanese Utility Model Laid-Open Publication No. 59-116401).

In the proposed linear guide apparatus, as shown in FIGS. 1 and 2, a linear channel 1a is formed in the upper surface of a guide rail 1 to extend in the longitudinal direction. A head 4A of a bolt 4 for securing the guide rail 1 to a base 3 is accommodated in the linear channel 1a, and a male thread portion 4B of the bolt 4 is threaded into a threaded hole 6 of the base 3 through a bolt hole 5 formed penetrating the guide rail 1. furthermore, a dust proof plate 7 extending in the longitudinal direction, of guide rail 1, is mounted on the opening of the linear channel 1a. The dust proof plate 7 is made of synthetic resin, and has a flat trapezoidal cross section. The opposite side surfaces of the dust proof plate 7 are formed with engaging ridge portions 8, and corresponding recess portions 9 are formed in the linear channel 1a. After the guide rail 1 is secured to the base 3 by bolt 4, the dust proof plate 7 is inserted into the linear channel 1a from one end of the guide rail 1 to cover the opening of linear channel 1a.

However, in such a prior art linear guide apparatus, the dust proof plate 7 is fixed to the guide rail 1 only by fitting ridge portions 8 and recess portions 9 to each other, and no securing means for clamping is provided. As a result, when the sliding resistance of the wiper seals is large, the dust proof plate 7 on the guide rail 1 slides and moves in the axial direction, thereafter the linear channel 1a and the bolt head 4A are exposed allowing dust to be deposited thereon. Moreover, the problem of high manufacturing cost has been involved since it is necessary to form the ridges on the dust proof plate 7 by using a metal mold, and since it is also necessary to form the recess portions in the guide rail 1.

SUMMARY OF THE INVENTION

It is an object of the present invention to solve the problems in the prior art and to provide a linear guide apparatus having a dust proof structure, which does not become loose or out of place during use, and that has a low manufacturing cost.

To achieve these objects in the present invention, a linear guide apparatus, including an axially extending guide rail secured to a base by bolts and a slider fitted to the guide rail and moveable in the axial direction through many rollable balls, is provided with a dust proof device comprising a strap-shaped plate mounted on an upper surface of the guide rail having through holes opening at the upper surface, hold-down blocks for pressing the strap-shaped plate at opposite ends thereof, and fixing screws penetrating through the hold-down blocks and the strap-shaped plate and threaded into the guide rail.

The strap-shaped plate is made by cutting a long, thin strap plate to a predetermined size, and subsequently forming through holes at opposite ends for the fixing screws. Thus, the formation of the strap-shaped plate is very simple. On the other hand, only screw holes are required to be drilled in the guide rail.

The strap-shaped plate can be easily mounted on the guide rail, by placing it on the upper surface of the guide rail, superposing the hold-down blocks on opposite ends of the strap-shaped plate, inserting the fixing screws, penetrating through the hold-down blocks and the strap-shaped plate, and threading the fixing screws into the threaded holes of the guide rail. The hold-down blocks tightened by the fixing screws prevent the strap-shaped plate from being displaced.

DESCRIPTION OF THE PREFERRED EMBODIMENTS

Figure 1:
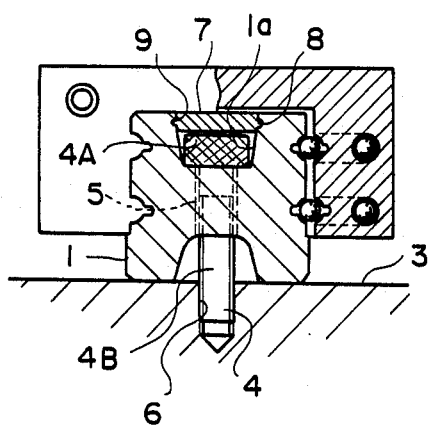
FIG. 1 is a front sectional view of a prior art linear guide apparatus.
Figure 2:
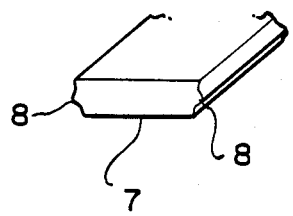
FIG. 2 is an enlarged perspective view of the dust proof plate in FIG. 1.
Figure 3:
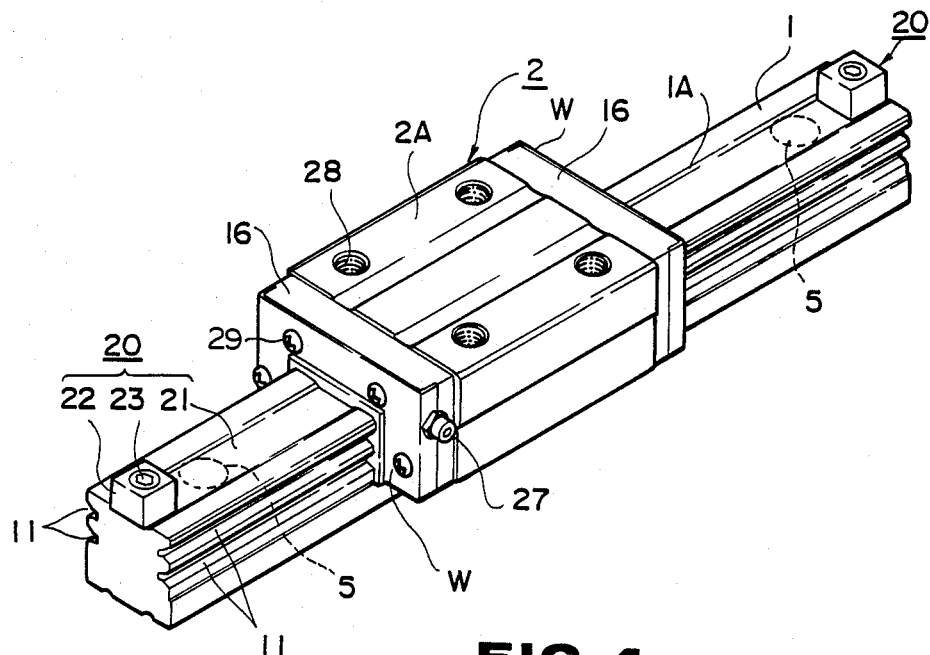
FIG. 3 is a perspective view of a linear guide apparatus depicting an embodiment of the invention.
Figure 4:
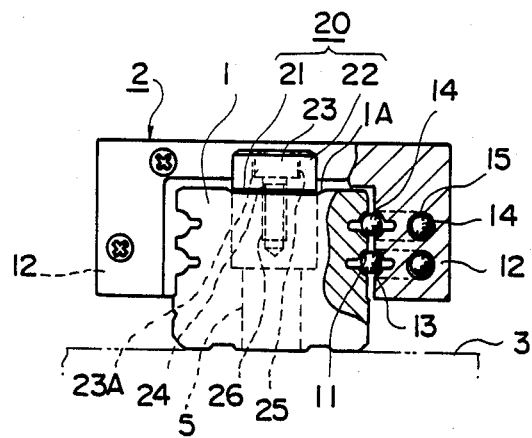
FIG. 4 is a front view partially in section of the apparatus of FIG. 3.

FIGS. 3 and 4 shows a linear guide apparatus of an embodiment of the invention comprising a guide rail 1 extending in the axial direction and slider 2 mounted movably on the guide rail 1 in a straddling relationship thereon. The guide rail 1 has ball rolling grooves 11 formed in opposite side surfaces extending in the axial direction, and the slider 2 has ball rolling grooves 13, corresponding to the ball rolling grooves 11, formed in the inner surfaces of side walls 12 of a slider body 2A. A multiplicity of balls 14 are inserted rollably between corresponding ones of the ball rolling grooves 11 and 13, so that the slider 2 is moved in the axial direction through the rolling of the balls 14. With this movement of the slider 2, the balls 14 interposed between the guide rail 1 and the slider 2 are moved to one end of the slider body 2A of the slider 2. Accordingly, in order to move the balls 14 continuously in the axial direction, it is necessary to circulate the balls 14. For this reason, ball return holes 15 are formed in the wall portions 12 of the slider body 2A, and at the same time, end caps 16 are provided at the front and rear ends of the slider body 2A. Each of the end caps 16 has a U-shaped connection path which is in communication with the ball return hole 15 so as to form a ball circulating path.

A dust proof device 20 is mounted on the upper surface of the guide rail 1. The dust proof device 20 includes a strap-shaped plate 21 mounted on the guide rail 1 extending over the entire length of the guide rail 1. Hold down blocks 22 serve as a securing member for the strap-shaped plate 21 to the guide rail 1 by holding down the strap-shaped plate 21 at opposite ends thereof in the axial direction. Fixing screws 23 are threaded into the guide rail 1 by penetrating through the hold-down blocks 22 and the strap-shaped plate 21.

The strap-shaped plate 21 is made of a strap-shaped metal plate, such as a steel belt or the like, and has a width corresponding to the width of a channel 1A on the upper surface of the guide rail 1. Furthermore, through holes (not shown) are formed at lengthwise opposite ends of the strap-shaped plate 21 for the passage of fixing screws 23. The hold-down blocks 22 are placed at positions corresponding to the through holes for the fixing screws 23.

The hold-down blocks 22 are of a square shape having a side approximately equal to the width of the strap-shaped plate 21. A through hole 24 for inserting the fixing screw 23 and a counter sunk portion 25 for accommodating a head portion 23A of the fixing screw 23 are formed at the center of each of the hold-down blocks 22.

A wiper seal W is attached to an outer end face of each of the end caps 16 by screws 29. A grease nipple 27 is fixed to a side of the end cap 16. Further, the reference numeral 28 designates threaded holes for mounting bolts used to attach, for example, a table or the like to the slider body 2A.

In attaching the dust proof device 20 to the guide rail 1, the strap-shaped plate 21 is placed on the channel 1A formed in the upper surface of the guide rail 1. (In the case wherein the slider 2 has already been mounted on the guide rail 1, the strap-shaped plate 21 may be inserted from one end of the channel 1A.) Next, the fixing screw through holes at opposite ends of the strap-shaped plate 21 are respectively aligned with the threaded holes 26 formed in the guide rail 1. The hold-down blocks 22 are superposed on the strap-shaped plate 21 at the position is corresponding to the threaded holes 26. The fixing screws 23 are inserted through the penetrating holes 24 and tightened so that they are threaded into the threaded holes 26.

When the slider 2 having the dust proof device 20 attached thereto moves on the guide rail 1, the inwardly protruding lip portions of the wiper seal W wipe off the dust deposited on the ball rolling grooves 11 of the guide rail 1 and the surface of the strap-shaped plate 21 mounted on the channel. At this time, the through holes 5 for the plurality of bolts 4, which secure the guide rail 1 to the base 3, are all covered with the strap-shaped plate 21. Thus, the movement of the slider 2 is very smooth. In addition, sine the strap-shaped plate 21 is tightly secured to the guide rail 1 by the hold-down blocks 22 and fixing screws 23. The strap-shaped plate 21 is not displaced out of position.

Moreover, the hold-down blocks 22 serve as stoppers for preventing the slider 2 from slipping off of guide rail 1.

While, in the above embodiment, the hold-down blocks 22 are formed in a square shape, the hold-down blocks 22 are not limited to this shape, but a cylindrical shape, or a flat plate shape, such as a flat washer, may be used.

The strap-shaped plate 21 is not necessarily made of metal, but it may be made of synthetic resin. In either case, since it is a simple plate member, there is no need to use a metal mold for manufacturing the plate. Thus, the strap-shaped plate can be manufactured inexpensively and easily.

As described in the foregoing, in the present invention, the strap-shaped plate is mounted on the upper surface of the guide rail throughout the whole length thereof, covering the surface through which the through holes for the securing bolts open, and at the same time, the strapshaped plate is mounted on the guide rail by the fixing screw. As a result, even when the sliding resistance of the wiper seal is large, the strap-shaped plate on the guide rail never moves in the axial direction, and unsmooth movement of the slider due to deposited dust can be prevented. Furthermore, the strap-shaped plate can be formed without using a metal mold, and the advantage is provided that the manufacturing cost is low.

What is claimed is:

1. In a linear guide apparatus including a longitudinally extending guide rail secured to a base by a bolt, and a slider fitted to said guide rail through a multiplicity of balls and movable in the longitudinal direction, a dust proof device used with said linear guide apparatus comprising:
   a strap-shaped plate mounted on an upper surface of said guide rail throughout the whole length thereof to cover a through hole for said bolt having an opening at the upper surface of said guide rail;
   a pair of hold-down blocks for pressing said strap-shaped plate at opposite ends thereof against said guide rail; and
   a pair of fixing screws penetrating through said hold-down blocks and said strap-shaped plate and threaded into said guide rail.

2. A dust proof device according to claim 1, wherein said strap-shaped plate is made of metal.

* * * * *